United States Patent
Nishioka et al.

(10) Patent No.: US 8,254,067 B2
(45) Date of Patent: Aug. 28, 2012

(54) TUNNEL JUNCTION TYPE MAGNETO-RESISTIVE HEAD

(75) Inventors: Koichi Nishioka, Kanagawa (JP); Hiroaki Chihaya, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 305 days.

(21) Appl. No.: 12/563,943

(22) Filed: Sep. 21, 2009

(65) Prior Publication Data
US 2010/0103564 A1 Apr. 29, 2010

(30) Foreign Application Priority Data
Oct. 27, 2008 (JP) .................. 2008-275851

(51) Int. Cl.
*G11B 5/39* (2006.01)
*C23C 14/34* (2006.01)

(52) U.S. Cl. ............ 360/324.2; 204/192.2; 204/192.3

(58) Field of Classification Search .......... 360/324.2; 204/192.2, 192.3, 192.32
See application file for complete search history.

(56) References Cited

U.S. PATENT DOCUMENTS

| | | | |
|---|---|---|---|
| 2003/0030945 A1* | 2/2003 | Heinonen et al. | 360/324.2 |
| 2008/0055793 A1* | 3/2008 | Djayaprawira et al. | 360/324.2 |
| 2008/0124581 A1 | 5/2008 | Miura et al. | |
| 2008/0232003 A1 | 9/2008 | Ibusuki et al. | |
| 2008/0253038 A1 | 10/2008 | Nakabayashi et al. | |
| 2009/0053833 A1* | 2/2009 | Kikuchi et al. | 438/3 |
| 2009/0213503 A1* | 8/2009 | Sun et al. | 360/324.2 |

FOREIGN PATENT DOCUMENTS

| | | |
|---|---|---|
| JP | 3083237 | 9/1996 |
| JP | 2008-060273 | 3/2008 |
| JP | 2008-135432 | 6/2008 |
| JP | 2008-249616 | 10/2008 |

OTHER PUBLICATIONS

Reed-Hill, Robert E. "Physical Metallurgy Principles, 2d Ed." (Monterey, CA: Litton Educational Publishing, Inc.) 1973. pp. 17-18.*
K. Tsunekawa et al., "CoFeB/MgO/CoFeB Magnetic Tunnel Junctions with High TMR and Low Junction Resistance", InterMag 2005, FB-05, Apr. 7, 2005.
J. C. S. Kools et al., "Effects of finite magnetic film thickness on Neel coupling in spin valves", J. Appl. Phys., vol. 85, No. 8 (1999), p. 4466-4468.

* cited by examiner

*Primary Examiner* — Julie Anne Watko
(74) *Attorney, Agent, or Firm* — Zilka-Kotab, PC

(57) ABSTRACT

As recording density of sensors is increased, it is desired to lower the areal resistivity (RA) of TMR sensors. Decreasing RA to 1.0 $\Omega\mu m^2$ or below badly influences the read signal since the interlayer coupling magnetic field (Hint) between the pinned layer and the free layer increases sharply and impedes the free rotation of magnetization of the free layer. According to one embodiment, a tunnel junction type magneto-resistive head solves this problem by having a layered film comprising an underlying layer, a crystalline orientation control layer, an antiferromagnetic layer, a first ferromagnetic layer, an antiparallel coupling layer, a second ferromagnetic layer, an insulation barrier layer, and a third ferromagnetic layer between a lower magnetic shield layer and an upper magnetic shield layer, wherein a crystallographic plane of the antiferromagnetic layer is directed parallel to a film surface by growing the antiferromagnetic layer substantially conformably on the crystalline orientation control layer.

14 Claims, 14 Drawing Sheets

Fig. 1

| Material | Atomic arrangement at interface |
|---|---|
| MnIr | fcc a=3.79Å<br>3.79Å<br>fcc (001) plane |
| NiFe | fcc a=3.58Å<br>3.58Å<br>fcc (001) plane |

Lattice mismatching: 5.9%

Fig. 11A
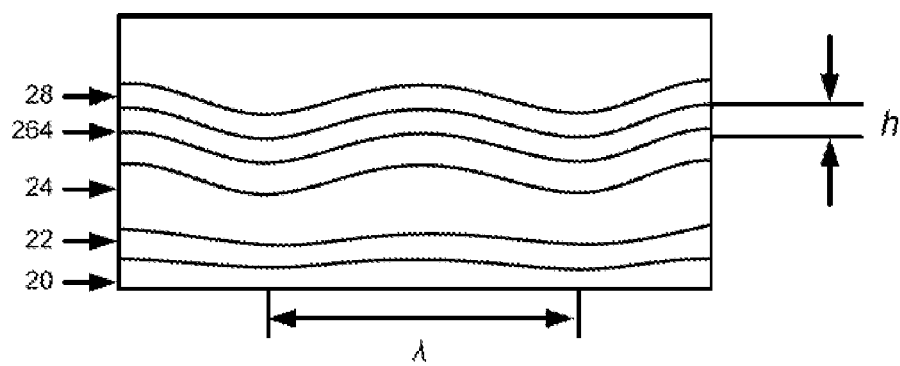
Fig. 11B
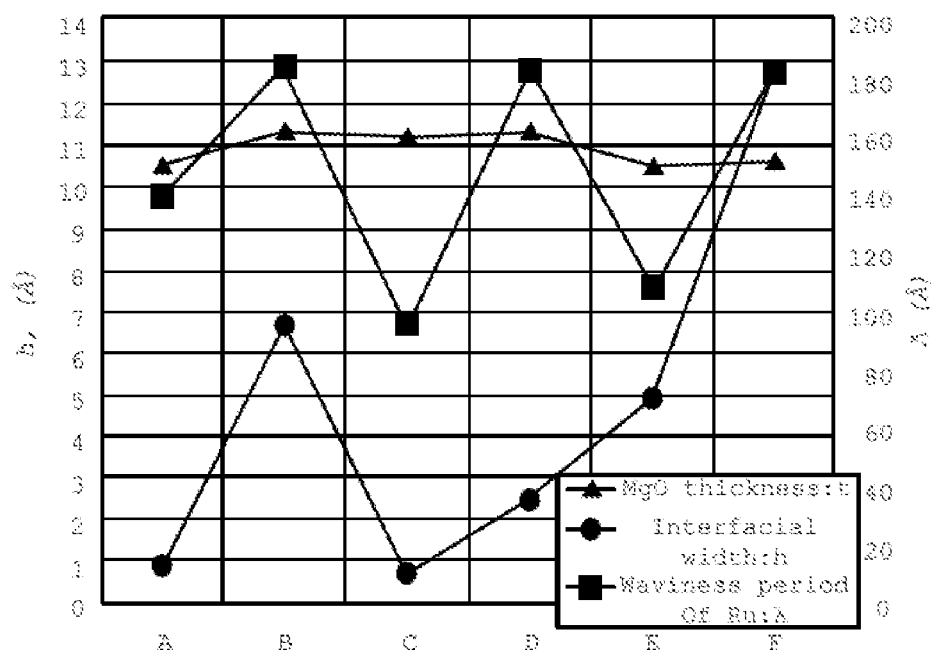
Fig. 11C
| Film Structure | A | B | C | D | E | F |
|---|---|---|---|---|---|---|
| CoFeB additional deposition | Done | Done | Not Done | Not Done | Not Done | Not Done |
| Plasma etching | Medium | Medium | Strong | Strong | Not Done | Not Done |
| MnIr crystalline orientation | (001) | (111) | (001) | (111) | (001) | (111) |

(a)

(b)

(a)

(b)

| Areal recording density (Gb/in²) | 350 | 500 | 750 | 1000 |
|---|---|---|---|---|
| Read track width (nm) | 60 | 50 | 40 | 30 |
| Stripe height (nm) | 60 | 50 | 40 | 30 |
| Areal resistivity RA (Ωμm²) | 1.4 | 1.0 | 0.6 | 0.4 |

| Material | Interfacial atomic arrangement |
|---|---|
| MnIr | fcc a=3.79 Å<br><br>2.68 Å<br>fcc (1̄11) plane |
| Ru | hcp a=2.71 Å<br><br>2.71 Å<br>fcc (1̄11) plane |

| Material | Interfacial atomic arrangement |
|---|---|
| MnIr | fcc a=3.79 Å<br><br>2.68 Å<br>fcc (1̄11) plane |
| NiFe | hcc a=3.58 Å<br><br>2.53 Å<br>fcc (1̄11) plane | ved.

TUNNEL JUNCTION TYPE MAGNETO-RESISTIVE HEAD

RELATED APPLICATIONS

The present application claims priority to a Japanese Patent Application filed Oct. 27, 2008 under Appl. No. 2008-275851, which is incorporated herein by reference.

FIELD OF THE INVENTION

The present invention relates to a tunnel junction type magneto-resistive head mounted in magnetic recording/reproducing device such as a magnetic disk drive.

BACKGROUND OF THE INVENTION

Magnetic disk drives are desired for their large capacity, and the demand for these drives is intensifying more and more for uses as so-called household information appliances such as video recorders, audio equipment, car navigation equipment, video cameras, etc., in addition to the drives' conventional application as major storage devices for computers. Accordingly, technologies for improving the areal recording density of hard disk drives have been developed. To improve the recording density, it is sometimes necessary to make the write and read track width and the read gap of a magnetic head wider. Specifically, the magneto-resistive (MR) sensor used as a read device may be made smaller including the read track width, stripe height and film thickness thereof. Here, the terms "read track width" and "stripe height" respectively represent the width and depth of the sensor as viewed from the medium facing the magnetic head.

Higher recording density may be realized by making the width and bit length of tracks recorded on the recording medium smaller. This lowers the magnitude of read signal magnetic flux generated from bits recorded on the medium. Therefore, in order to realize higher recording density, the sensitivity of the sensor used in the read head can be raised.

Until recent years, GMR (Giant Magneto-Resistive) film had been used as the sensor in a read head. The MR ratio is a parameter that can represent the sensitivity performance of a magneto-resistive sensor. The MR ratio, expressed in percentage (%), indicates the ratio of the sensor's change in resistance to the minimum resistance. In GMR sensors, the MR ratio is 15% at most.

For areal recording densities not higher than 100 Gb/in$^2$, GMR films were used as sensors in read heads. Beyond 100 Gb/in$^2$, however, still higher sensitivity TMR (Tunnel Magneto-Resistive) films are used as sensors in place of GMR films since GMR films are not sufficient in sensitivity.

The basic structure of the TMR sensor film is basically the same as that of the GMR film, which is commonly referred to as a spin valve, except that an insulation barrier layer is formed in place of a non-magnetic conductive spacer. The TMR sensor film has a layered structure comprising: an underlying layer; an antiferromagnetic layer; a first ferromagnetic layer which is exchange-coupled to the antiferromagnetic layer; a second ferromagnetic layer whose magnetic moment is coupled in antiparallel with the magnetic moment of the first ferromagnetic layer via an antiparallel coupling layer; an insulation barrier layer; and a third ferromagnetic layer. The first and second ferromagnetic layers are called a pinned layer. Since the magnetic moments of the first and second ferromagnetic layers constituting the pinned layer are strongly coupled in antiparallel with each other and the magnetic moment of the first ferromagnetic layer is strongly pinned due to exchange coupling with the antiferromagnetic layer, the pinned layer does not easily change the direction of its magnetic moment. The third ferromagnetic layer is called a free layer and the direction of its magnetic moment easily changes by an externally applied magnetic field.

Magnetic information recorded on a medium may be reproduced through the following process. A signal magnetic field occurring from a recorded bit enters the sensor. The signal magnetic field rotates the magnetic moment of the free layer. This changes the relative angle of the magnetic moment of the free layer with respect to that of the pinned layer. The changed relative angle changes the probability of spin-dependent electron scattering, resulting in a change in the resistance of the sensor. By converting this resistance change of the sensor to an electrical signal, the recorded bit information is reproduced.

The TMR sensor differs from the GMR sensor in that the sense current flowing through the TMR sensor is perpendicular to the sensor film while the sensor current through the GMR sensor is along the sensor film. Thus, its electrode structure for applying a current to the sensor film is also different from that of the GMR sensor. In principle, although both lie in the common phenomenon that resistance changes depending on electron-spin scattering in a magnetic structure, these electrons in the GMR sensor are conduction electrons which move in metal while in the TMR sensor they are electrons which pass through an insulation barrier layer by the tunnel effect.

FIG. 15 is an example of an estimated road map of the read track width, stripe height and areal resistivity (RA) for higher areal recording densities in the future. In FIG. 15, RA is an electrical resistance perpendicular to the sensor film surface of one μm$^2$. Since the TMR sensor passes a current perpendicularly through the film, the resistance of the sensor is inversely proportional to the area of the sensor.

Raising the recording density results in a decrease of the sensor area through which the sense current passes since the read track width and stripe height are made smaller. Thus, if the RA remains the same, the resistance increases in reverse proportion to the sensor area. For example, if the recording density is raised from 350 Gb/in$^2$ to 1000 Gb/in$^2$ as is shown in FIG. 15, the resistance quadruples since the sensor area decreases to a fourth. When the resistance increases like this, the signal processing circuitry does not properly operate. Therefore, the resistance of the sensor, as viewed from the signal processing circuitry, is kept constant to avoid problems. That is, decreasing the areal resistivity RA of the sensor as the sensor is reduced in size is appropriate. In FIG. 15, RAs are calculated so as to keep constant the resistance of the sensor even when the sensor area is reduced. As shown in FIG. 15, the RA is decreased to 1.0 and 0.4 at areal recording densities of 500 Gb/in$^2$ and 1000 Gb/in$^2$, respectively. Although FIG. 15 is merely an estimation which may include large or small differences from true values, it represents a future trend.

As described above, for higher recording density, it is technologically logical for the sensor to have a higher MR ratio and a lower RA. In initial TMR sensors, insulation barrier layers were made of alumina or titanium oxide. Their MR ratio was about 30% while that of GMR sensors was 15% at most. This much larger MR ratio contributed to realizing higher sensitivity sensor films, resulting in commercialization of TMR heads.

Then, studies of magnesium oxide earnestly began as a material for insulation barrier layers in TMR sensors. Attention to this material is attributable to W. H. Buttler who indicated in 2001 that according to theoretical calculation, MR ratios beyond 1000% may be realized by a structure comprising a (001)-oriented MgO layer sandwiched between (001)-oriented iron layers. Further, Yuasa et al. disclosed that MgO (001) is grown conformably on single-crystal Fe (001) by using the MBE method, exhibited 180% at room temperature, the highest MR ratio at that time.

Although such a high MR ratio was attractive in view of many desired applications, the proposed structure comprising MgO grown conformably on single-crystal Fe was difficult to directly apply to electronic devices, such as magnetic heads and MRAMs, since the sensor must be formed on a polycrystalline magnetic shield.

According to Japanese Patent Office (JPO) Pub. No. JP-A-2008-135432, high crystallinity MgO can be deposited on an amorphous CoFeB alloy film by a sputtering method to obtain, by annealing it, a high MR ratio of 180% at room temperature. However, its areal resistivity is as high as 1000 $\Omega\mu m^2$, according to this reference, leaving a problem to be solved before the method can be applied to hard disk read heads.

Therefore, studies have been made to attain a MgO-used TMR sensor having a lower RA and improved MR ratio, aimed at applications like hard disk read heads. In K. Tsunekawa et al., "CoFeB/MgO/CoFeB Magnetic Tunnel Junctions with High TMR Low Junction Resistance", InterMag 2005, FB-05, Apr. 7, 2005, a method for fabricating an insulation barrier layer is disclosed. In this method, after a thin metallic magnesium layer of approximately 0.4 nm is deposited, a magnesium oxide layer is formed by a RF sputtering method with a MgO target. This method has realized a high MR ratio of 100% with an RA of 2.0 $\Omega\mu m^2$.

In this document, the interlayer-coupling magnetic field Hint is also considered. The interlayer-coupling magnetic field Hint is a magnetic field which the free layer receives from the pinned layer. Since the free layer is always subject to the interlayer-coupling magnetic field Hint, this magnetic field, if large, affects the free rotation of the free layer's magnetization and consequently lowers the symmetry property and intensity of the read signal waveform. In this document, the Hint increases as the RA decreases (that is, the thickness of the MgO layer decreases) and reaches to as large is 80 Oe at an RA of 2.0 and greatly exceeds 100 Oe at an RA of 1.0. The inventors predicted that if the RA is further decreased below 1.0, the Hint would steeply increase and reach to 200 Oe and it would become necessary to decrease the Hint in such a low RA region. In this connection, in the case of GMR head sensors, the interlayer-coupling magnetic field was controlled to 30 Oe at its highest.

In K. Tsunekawa et al., "CoFeB/MgO/CoFeB Magnetic Tunnel Junctions with High TMR and Low Junction Resistance", InterMag 2005, FB-05, Apr. 7, 2005, an antiferromagnetic PtMn layer is deposited on an underlying Ta layer. However, this structure is almost never used in TMR heads due to poor practicality since the magnetization of the pinned layer is not sufficiently pinned. In the current structure employed in commercialized versions, the underlying layer is a layered film composed of Ta and Ru layers, Ta and NiFeCr alloy layers, or Ta and NiFe alloy layers, the anti ferromagnetic layer is made of MnIr alloy, the first ferromagnetic layer is made of CoFe alloy, and the antiparallel coupling layer is made of Ru.

In the currently used above structure whose underlying layer is a laminated film composed of Ta and Ru layers, Ta and NiFeCr alloy layers, or Ta and NiFe alloy layers, the antiferromagnetic MnIr alloy layer has a face centered cubic (fcc) crystal structure with the orientation (111) grown preferentially parallel to the film surface. In JPO Pub. No. JP-A-2008-60273 and Jap. Pat. No. 3083237, it is described that the orientation (111) of the fcc structure of MnIr is used and preferable, respectively.

Usually, out of all of the crystallographic planes, the closest-packed plane has the smallest interfacial energy. Therefore, crystal generally grows so that the closest-packed plane forms the surface. FIGS. 16A-16B show crystallographic conformability relations. Since Ru has a hexagonal close-packed (hcp) crystal structure and its (001) plane is closest-packed, Ru is preferentially (001)-oriented. MnIr on Ru is (111)-oriented since MnIr has a face-centered cubic crystal structure, its (111) plane is closest-packed and, as shown in FIG. 16A the lattice mismatching of the (111) plane with Ru (001) is as small as 1.1%. In the case of NiFeCr or NiFe, its crystal system is fcc and the (111) plane is closest-packed. Therefore, NiFeCr or NiFe is preferentially (111)-oriented and MnIr thereon is also (111)-oriented since MnIr also has a fcc crystal structure, its (111) plane is closest-packed, the lattice mismatching of the (111) plane with NiFeCr or NiFe is about 5.9%, relatively small, and the interfacial energy of the MnIr (111) plane is small.

As mentioned earlier, to realize higher recording density in the future, the RA can be lowered to 1.0 $\Omega\mu m^2$ or lower. Lowering the RA below 1.0 $\Omega\mu m^2$ remarkably enlarges the Hint. Therefore, suppressing the Hint is one way to help achieve a lowered RA.

As a generation mechanism of the Hint, it is put forward that the Hint is attributable to the waviness of the interfaces of the insulation layer with the ferromagnetic layers. Its theory is illustrated in FIG. 17. If the waviness is large, magnetic poles are generated at the interfaces. A Hint is generated as a result of interaction between magnetic poles (190 and 200 in FIG. 17) at the respective interfaces of the pinned layer 160 and free layer 150. This theory is known as Neel's orange peel coupling. If the MgO layer is thinned to decrease the RA for meeting the demand for higher densities, this sharply enhances the interaction between magnetic poles, the interaction being generated due to the waviness of the interfaces with the pinned layer and free layer, and thus sharply enlarges the Hint. For example, J. C. S. Kools et al., "Effects of finite magnetic film thickness on Neel coupling in spin valves", J. Appl. Phys., Vol. 85, No 8 (1999), p. 4466-4468, describes this interaction in spin valves.

In addition, as shown in K. Tsunekawa et al., CoFeB/MgO/CoFeB Magnetic Tunnel Junctions with High TMR and Low Junction Resistance", InterMag 2005, FB-05, Apr. 7, 2005, if the MgO layer is thinned enough to decrease the RA to below 2.0 $\Omega\mu m^2$, the MR ratio sharply decreases. Below 1.0 $\Omega\mu m^2$, the sharp decrease of the MR ratio is very remarkable. Suppressing this decrease of the MR ratio is another technique that can help realize higher recording density.

Therefore, a technique which can suppress the Hint and suppress the decrease in MR ratio would be very beneficial to the manufacturing of read head sensors with higher areal densities.

SUMMARY OF THE INVENTION

As recording density of sensors is increased, it is desired to lower the areal resistivity (RA) of TMR sensors. Decreasing RA to 1.0 $\Omega\mu m^2$ or below badly influences the read signal since the interlayer coupling magnetic field (Hint) between the pinned layer and the free layer increases sharply and impedes the free rotation of magnetization of the free layer. According to one embodiment, a tunnel junction type magneto-resistive head solves this problem by having a layered film comprising an underlying layer, a crystalline orientation control layer, an antiferromagnetic layer, a first ferromagnetic layer, an antiparallel coupling layer, a second ferromagnetic layer, an insulation barrier layer, and a third ferromagnetic layer between a lower magnetic shield layer and an upper magnetic shield layer, wherein a non-closest-packed crystallographic plane of the antiferromagnetic layer is directed parallel to a film surface by growing the antiferromagnetic layer substantially conformably on the crystalline orientation control layer.

A method for manufacturing a tunnel junction type magneto-resistive head comprises depositing the crystalline orientation control layer by sputtering in a mixed gas of argon and nitrogen to produce a preferential growth of the crystallographic (001) plane of a Ni alloy, wherein the tunnel junction type magneto-resistive head has an underlying layer, a crystalline orientation control layer, an antiferromagnetic layer, a first ferromagnetic layer, an antiparallel coupling layer, a second ferromagnetic layer, an insulation barrier layer and a third ferromagnetic layer stacked between a lower magnetic shield layer and an upper magnetic shield layer.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 1 shows lattice mismatching between the (001) crystalline plane of the Ni Fe crystalline orientation control layer and a non-closest-packed plane (001) of the MnIr antiferromagnetic layer in a TMR sensor film in accordance with one embodiment.

FIGS. 11A-11C show the results of examining the interfacial waviness between the second ferromagnetic layer and the insulation barrier layer in terms of waviness height h and waviness period $\lambda$.

DETAILED DESCRIPTION

Figure 2:
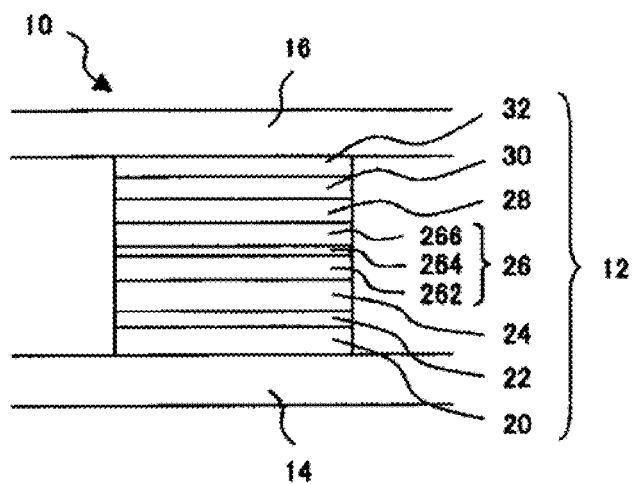
FIG. 2 shows the basic structure of a TMR head in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a tunnel junction type magneto-resistive head comprises a layered film comprising an underlying layer; a crystalline orientation control layer; an antiferromagnetic layer; a first ferromagnetic layer; an antiparallel coupling layer; a second ferromagnetic layer; an insulation barrier layer, and a third ferromagnetic layer between a lower magnetic shield layer and an upper magnetic shield layer, wherein a non-closest-packed crystallographic plane of the antiferromagnetic layer is directed parallel to a film surface by growing the antiferromagnetic layer substantially conformably on the crystalline orientation control layer.

In another general embodiment, a method for manufacturing a tunnel junction type magneto-resistive head comprises depositing a crystalline orientation control layer by sputtering in a mixed gas of argon and nitrogen to produce a preferential growth of the crystallographic (001) plane of a Ni alloy. The tunnel junction type magneto-resistive head comprises an underlying layer, a crystalline orientation control layer, an antiferromagnetic layer, a first ferromagnetic layer, an antiparallel coupling layer, a second ferromagnetic layer, an insulation barrier layer, and a third ferromagnetic layer stacked between a lower magnetic shield layer and an upper magnetic shield layer.

As described previously, to realize higher recording density, it is desirable to decrease the areal resistivity RA to 1.0 $\Omega\mu m^2$ or below. However, decreasing the RA to such a low value impedes the essential feature of the free layer or free magnetization since the interlayer coupling magnetic field between the pinned layer and the free layer increases sharply, as described above. In addition, decreasing the RA to 1.0 $\Omega\mu m^2$ or below desensitizes the sensor since the MR ratio sharply decreases.

Therefore, according to one embodiment, such a tunnel type magneto-resistive head is provided in which the interlayer coupling magnetic field Hint is small and the MR ratio is not substantially lowered although the areal resistivity RA is reduced to 1.0 $\Omega\mu m^2$ or below. Also, in another embodiment, a manufacturing method thereof is provided.

In one embodiment, a layered TMR sensor is used. This layered TMR sensor film structure comprises: an underlying layer; a crystalline orientation control layer on the underlying layer; an antiferromagnetic layer on the crystalline orientation control layer; a first ferromagnetic layer which is exchange-coupled to the antiferromagnetic layer; a second ferromagnetic layer whose magnetic moment is coupled in antiparallel with the magnetic moment of the first ferromagnetic layer via an antiparallel coupling layer; an insulation barrier layer on the second ferromagnetic layer; and a third ferromagnetic layer on the insulation barrier layer, wherein the antiferromagnetic layer has a cubic or tetragonal crystal structure and its non-closest-packed plane (for example, (001) plane) is grown in parallel to the film surface.

It has been found that if a non-closest-packed crystallographic plane of MnIr is grown, the surface waviness of MnIr reduces and the respective layers stacked thereon also become less wavy. This reveals that the interface between the pinned layer and the insulation barrier layer and the interface between the free layer and the insulation barrier layer become less wavy, which reduces the amount of magnetic poles appearing at the interface between the free layer and the insulation barrier layer and the interface between the pinned layer and the insulation barrier layer, and the interlayer coupling magnetic field Hint is suppressed.

What is important here is the fact that when the (001) plane of MnIr, which is not the closest-packed plane, is grown, its surface becomes less wavy. It is suggested that this fact is attributable to the following mechanism.

As described earlier, since the closest-packed plane of MnIr is (111), the (111) plane has the smallest interfacial energy. Usually due to this, the (111) plane preferentially grows in parallel to the film surface. On the other hand, preferential growth of the (001) plane does not usually occur since the (001) plane is not the closest-packed plane and has a large interfacial energy. According to one embodiment, however, the method of manufacturing reduces the surface waviness by growing the non-closest-packed plane (001) which usually does not preferentially grow. The surface energy is given by the product of the surface area and the interfacial energy. When a plane having a larger interfacial energy appears at the surface, the surface area reduces more so as to suppress the increase of the surface energy. The surface area is the smallest when the surface is completely flat. Thus, when a plane having a large interfacial energy is grown, the surface constituted by this plane becomes less wavy than the surface constituted by the growth of a plane having a small interfacial energy.

Usually, since planes with large interfacial energies do not appear at the surface, the above-mentioned advantage can not be utilized. In one embodiment, however, less wavy interfaces are realized than is usually unattainable by using a crystal growth technology which constructs the surface via a crystallographic plane having a large interfacial energy. As a result, the problem of reducing the interlayer coupling magnetic field between the pinned layer and the free layer is successfully solved.

The following provides a description of the crystal growth technology for constructing the surface via a crystallographic plane having a large interfacial energy. Normal deposition of, for example, NiFe, on a Ta underlying layer results in a (111)-oriented NiFe layer thereon since the closest-packed plane (111) of NiFe grows preferentially. When a MnIr antiferromagnetic layer is then deposited under this condition, since the closest-packed plane (111) of MnIr grows preferentially, it is not possible to construct the surface via the (001) crystallographic plane having a large interfacial energy.

In accordance with one embodiment, the NiFe layer is deposited by sputtering with a nitrogen-mixed argon gas. Nitrogen atoms are interstitially incorporated into the NiFe crystal. This makes the (001) plane have a smaller interfacial energy than the (111) plane. Therefore, it is possible to realize (001)-oriented NiFe by preferential growth of the (001) plane. Then, MnIr is deposited on the (001)-oriented NiFe. Although the preferential orientation of MnIr is (111), (001)-oriented MnIr grows so as to lower the interfacial energy of the interface with the NiFe. Thus, it is possible to grow a crystallographic plane having a large interfacial energy.

In general terms, to make it possible that a crystallographic plane of a material A having a large interfacial energy grows in parallel to the film surface, a crystal control layer B is deposited first. The crystal control layer B is a layer of a material having a crystallographic plane which lattice-matches well with the crystallographic plane of the material A to be grown thereon. This well matching crystallographic plane is grown to constitute the crystal control layer B. In the above example, this layer corresponds to the (001)-oriented NiFe layer obtained by depositing NiFe in an atmosphere of Ar and N. Then, the material A is deposited on the crystal control layer B. Since the material A grows in conformance with the previously grown plane of the material B, its crystallographic plane grows to constitute the surface, and has a large interfacial energy.

It is preferable that a material used as a crystal control layer has a preferentially grown crystallographic plane which matches well with a crystallographic plane of the material to be deposited thereon having large interfacial energy, or else the material to be deposited thereon may not grow in the desired orientation.

This crystal growth technique is applicable to such materials as MnIr, but not to all materials. For example, on a (001)-oriented NiFe layer, it is not possible to deposit a CoFe alloy layer having the non-closest-packed plane (001) grown. This technique is inapplicability to CoFe because of the excessively large difference of interfacial energy between the closest-packed plane (111) and the not-closest-packed plane (001). That is, although the (001)-oriented layer grows from the interface to a thickness of 2 or 3 atoms due to good matching of the not closest-packed plane (001) with the underlying layer, the orientation changes to (111) as the thickness increases since the interfacial energy of the closest-packed plane (111) is remarkably smaller than that of the (001) plane.

On the less wavy surface of an antiferromagnetic layer having the (001) plane grown as described above, a first magnetic layer, antiparallel coupling layer, second ferromagnetic layer, insulation barrier layer, and third ferromagnetic layer are deposited, preferably in this order. The surface waviness of the antiferromagnetic layer is copied to the interface between the second ferromagnetic layer and the insulation barrier layer and to the interface between the insulation barrier layer and the third ferromagnetic layer. Therefore, in a case where the surface waviness of the antiferromagnetic layer is small, the interface between the second ferromagnetic layer and the insulation barrier layer and the interface between the insulation barrier layer and the third ferromagnetic layer become less wavy. Since this decreases the magnetic poles which may appear at the two interfaces and therefore reduces the interaction between the two magnetic layers, it is possible to reduce the interlayer coupling magnetic field Hint.

The second ferromagnetic layer is deposited after the first ferromagnetic layer and antiparallel coupling layer are deposited on the antiferromagnetic layer having the non-closest-packed plane grown parallel to the film surface. It has been surprisingly discovered that constructing the second ferromagnetic layer with two layers made respectively of CoFeB alloy and CoFe alloy remarkably reduces the interlayer coupling magnetic field. Although its mechanism is not clear yet, a remarkably large reduction effect is obtained by application on an antiferromagnetic MnIr layer having the non-closest-packed plane (001) grown parallel to the film surface. Its effect will be detailed in the description of several embodiments. Preferably, the thickness of the CoFe layer is about 10 angstroms or smaller since increasing the thickness of the CoFe layer beyond about 10 angstroms merely lowers the MR ratio without further reducing the Hint, an undesirable effect.

The second ferromagnetic layer may be a CoFeB alloy layer, according to one embodiment. In this case, after the first ferromagnetic layer, antiparallel coupling layer and the second ferromagnetic CoFeB layer are deposited, preferably in this order, on the antiferromagnetic layer having the non-closest-packed plane grown parallel to the film surface, the CoFeB layer is etched by argon plasma etching. As the amount of etching is increased, the CoFeB surface becomes less wavy. It is possible to realize a super flat surface with sub-angstrom waviness.

Although performing plasma etching on the second ferromagnetic CoFeB layer can create a superiorly flat surface, this also introduces the problem of lowering the MR ratio. Therefore, CoFeB is deposited again after plasma etching is done. This can restore the lowered MR ratio without substantially increasing the waviness of the interface.

According to one embodiment, it is possible to provide a tunnel type magneto-resistive head in which the interlayer coupling magnetic field Hint is small and the MR ratio is not substantially lowered, although the areal resistivity RA is reduced to 1.0 $\Omega\mu m^2$ or below.

Firstly, with reference to FIG. 2, the basic configuration of a tunnel junction type magneto-resistive head (TMR head) is described, according to one embodiment. In FIG. 2, the TMR head is viewed from the air bearing surface (ABS) side. The TMR head 10 comprises a layered TMR film 12 between a lower magnetic shield layer (also serving as an electrode layer) 14 and an upper magnetic shield layer (also serving as an electrode layer) 16. On the lower magnetic shield layer (electrode layer) 14, used as a substrate, the TMR film 12 is fabricated. The TMR film 12 includes: an underlying layer 20; a crystalline orientation control layer 22; an antiferromagnetic layer 24; a first ferromagnetic layer 262 which is exchange-coupled to the antiferromagnetic layer 24; a second ferromagnetic layer 266 whose magnetic moment is coupled in antiparallel with the magnetic moment of the first ferromagnetic layer 262 via an antiparallel coupling layer 264; an insulation barrier layer 28; a third ferromagnetic layer 30; and a cap layer 32. The first and second ferromagnetic layers 262, 266 together are called a pinned layer 26. Since the magnetic moments of the first and second ferromagnetic layers 262 and 264 constituting the pinned layer 26 are strongly coupled in antiparallel with each other and the magnetic moment of the first ferromagnetic layer 262 is strongly pinned due to exchange-coupling with the antiferromagnetic layer 24, the pinned layer 26 does not easily change the direction of its magnetic moment. On the other hand, the third ferromagnetic layer 30 is called a free layer and the direction of its magnetic moment easily changes by an externally applied magnetic field. By using the drawings, several embodiments may be described in detail.

According to s first embodiment, the following five kinds of layered films were fabricated in the same vacuum facility and the crystalline orientation of the antiferromagnetic MnIr layer in each layered film was examined by X-ray diffraction.

(1) Substrate/Ta3 nm (Ar)/Ni-15 at % Fe2 nm (Ar)/Mn-22 at % Ir10 m (Ar)/Ru4 nm(Ar)

(2) Substrate/Ta3 nm(Ar)/Ru2 nm(Ar)/Mn-22 at % Ir10 nm(Ar)/Ru4 nm(Ar)

(3) Substrate/Ta3 nm(Ar)/Ni-15 at % Fe2 nm(Ar10 sccm+ $N_2$ 3 sccm)/Mn-22 at % Ir10 nm(Ar)/Ru4 nm(Ar)

(4) Substrate/Ta3 nm(Ar)/Ni-15 at % Fe2 nm(Ar10 sccm+ $N_2$ 6 sccm)/Mn-22 at % Ir10 nm(Ar)/Ru4 nm(Ar)

(5) Substrate/Ta3 nm(Ar)/Ni-15 at % Fe2 nm(Ar10 sccm+ $N_2$ 10 sccm)/Mn-22 at % Ir10 nm(Ar)/Ru4 nm(Ar)

The layered structures (1) and (2) have been used conventionally. For (1), a 3 nm Ta layer used as the underlying layer 20 is deposited on the substrate, a 2 nm NiFe alloy layer used as the crystalline orientation control layer 22 is deposited on the underlying layer, a 10 nm MnIr alloy layer used as the antiferromagnetic layer 24 is deposited on the crystalline orientation control layer, and a 4 nm Ru layer used as the protection layer is deposited on the antiferromagnetic layer. All layers from the underlying layer to the protection layer are deposited by a sputtering method by using a pure argon (Ar) gas as the sputtering gas. Each pair of parentheses in the notation of (1) through (5) contains an atomic symbol indicating the kind of the sputtering gas and, if pertinent, the flow rate of the gas. Film structure (2), similar to the film structure (1), is also deposited by using argon (Ar) gas. Film structure (2) is different from (1) in that a 2 nm Ru layer, instead of a NiFe alloy layer, is used as the crystalline orientation control layer 22.

Figure 3:
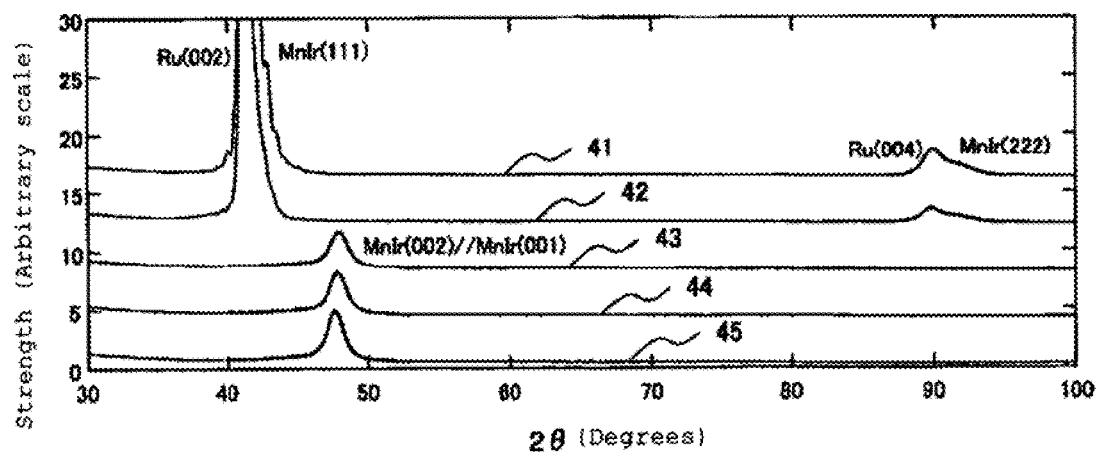
FIG. 3 shows out-of-plane X-ray diffraction spectrums of MnIr antiferromagnetic layers in layered films prepared for the purpose of examination of crystalline orientation.

In FIG. 3, results of examining the crystalline orientations of the films (1) and (2) by out-of-plane X-ray diffraction are respectively given reference numerals 41 and 42. The MnIr (111) diffraction peak and MnIr (222) diffraction peak are recognized respectively around at $2\theta=44°$ and $2\theta=92°$. Although the MnIr (111) diffraction peaks overlap with those of Ru (002), the MnIr (222) peaks are clearly recognized separately from the Ru (004) peaks. Therefore, in each of the structures (1) and (2), the antiferromagnetic MnIr layer has the closest-packed plane (111) grown therein as understood. This fact is similar to that indicated in JPO Pub. No. JP-A-2008-60273 and Jap. Pat. No. 3083237, cited earlier.

The film structures (3), (4) and (5) are similar to (1) but unique in that a mixed gas of argon (Ar) and nitrogen ($N_2$) is used as the sputtering gas for depositing a NiFe alloy layer as the crystalline orientation control layer. For the structure (3), $N_2$ gas is supplied at a flow rate of about 3 standard cubic centimeter per minute (sccm) in addition to Ar gas at about 10 sccm. For the structure (4), N₂ gas is supplied at about 6 sccm in addition to Ar gas at about 10 sccm. For the structure (5), Ar gas and N₂ gas are supplied respectively at about 10 sccm. When the antiferromagnetic MnIr layer is deposited on the crystalline orientation control NiFe layer, only Ar gas is supplied like in structures (1) and (2).

In FIG. 3, results of examining the crystalline orientations of those films obtained respectively by using a mixed gas of argon and nitrogen when the crystalline orientation control NiFe alloy layers were deposited are given reference numerals 43, 44 and 45, respectively. As apparent from the figure, the MnIr (111) diffraction peaks around at 2θ=44° and the MnIr (222) diffraction peaks at 2θ=92° are not recognizable. Instead, diffraction peaks appear around at 2θ=48°. They are the diffraction peaks of MnIr (002) parallel to MnIr (001). This indicates that when a mixed gas of argon and nitrogen is used to deposit the crystalline orientation control layer by sputtering like in structures (3), (4) and (5), the antiferromagnetic MnIr layer has the not-closest packed plane (001) grown.

Figure 16A:
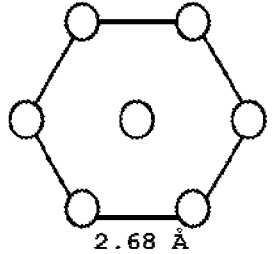
FIGS. 16A-16B show lattice mismatching of the MnIr (111) plane with the closest-packed plane (001) of Ru and with the (111) plane of NiFe.
Figure 16A:
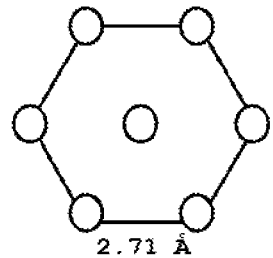
Figure 16B:
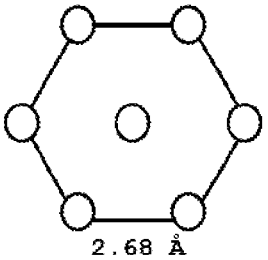
Figure 16B:
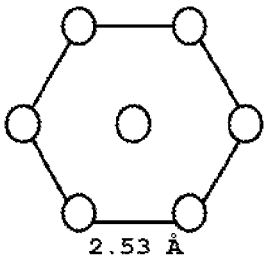

For the structures (1) and (2), FIG. 16B shows the atomic arrangements at the interface between the crystalline orientation control NiFe or Ru layer and the antiferromagnetic MnIr layer, according to one embodiment. In the case of structure (2), since the lattice mismatching is as small as 1.1% between the closest-packed hcp (001) plane of Ru and the closest-packed fcc (111) plane of MnIr and the interfacial energy of the fcc (111) plane is small, the MnIr layer becomes (111)-oriented due to the preferential fcc (111) growth. Similarly in the case of structure (1), since the lattice mismatching between the closest-packed fcc (111) plane of NiFe and the closest-packed fcc (111) plane of MnIr is 5.9%, relatively small, the MnIr layer becomes (111)-oriented.

For the structures (3), (4) and (5), FIG. 1 shows the atomic arrangements at the interface between the crystalline orientation control NiFe layer and the antiferromagnetic MnIr layer. Since the crystalline orientation control NiFe layer is deposited by sputtering with argon and nitrogen, the fcc (001) plane is grown. As described earlier, this is because nitrogen atoms are interstitially incorporated into NiFe crystal, which makes the interfacial energy of the (001) plane smaller than that of the (111) plane and therefore causes the preferential growth of the (001) plane. Since the lattice mismatching between the NiFe (001) plane and the MnIr (001) plane is small, i.e., 5.9%, the (001) plane of MnIr grows so as to decrease the interfacial energy with NiFe. Consequently, as indicated by reference numerals 43, 44 and 45 in FIG. 3, the non-closest-packed plane (001) of MnIr grows. Although NiFe is deposited as the crystalline orientation control layer in this consideration, the same result is obtained by constituting the crystalline orientation control layer by two layers made respectively of NiFeCr and NiFe both of which are deposited with a mixed gas of argon and nitrogen.

Figure 4A:
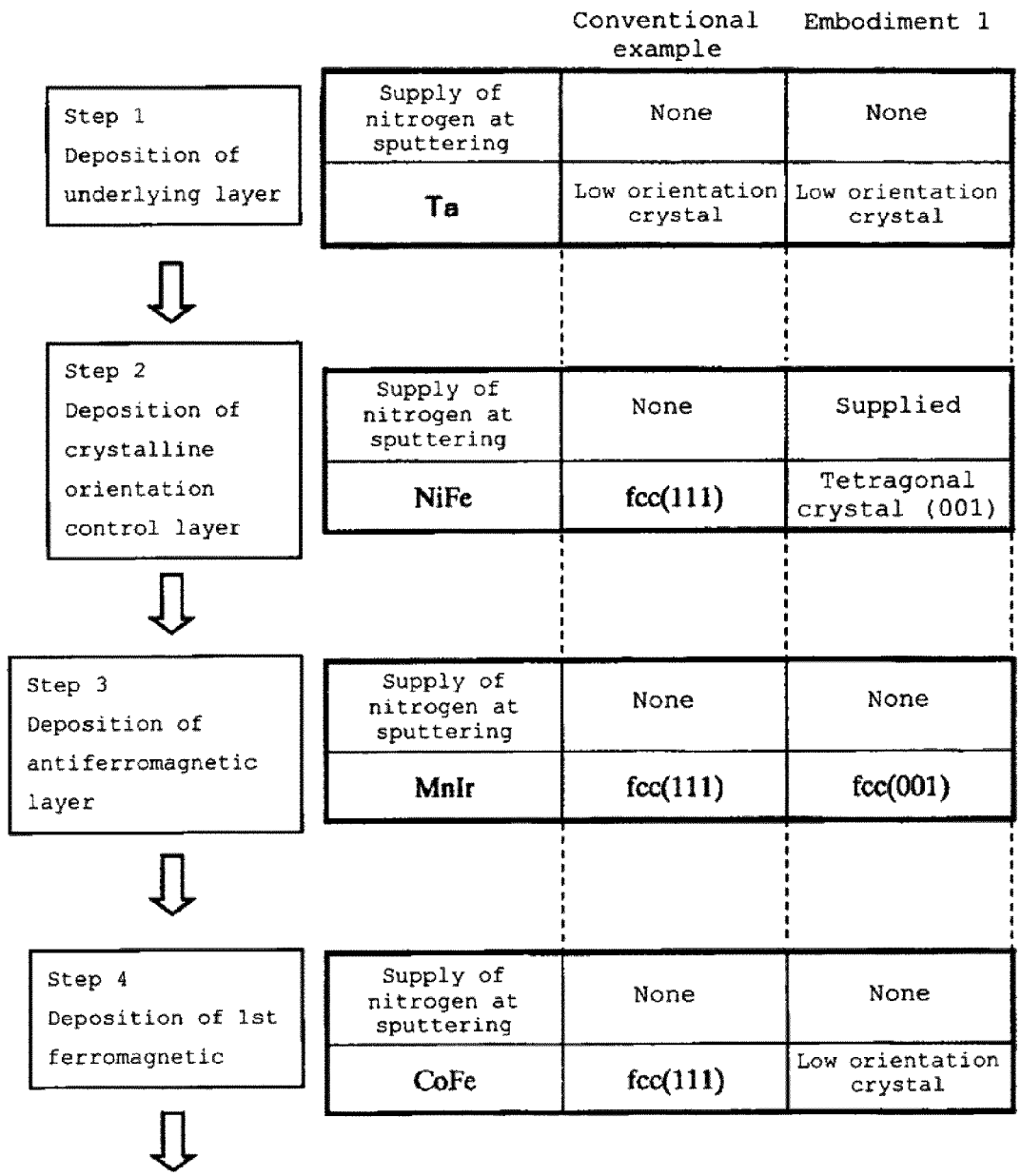
FIG. 4A is a process chart indicating the process for fabricating a TMR sensor film in accordance with one embodiment.
Figure 4B:
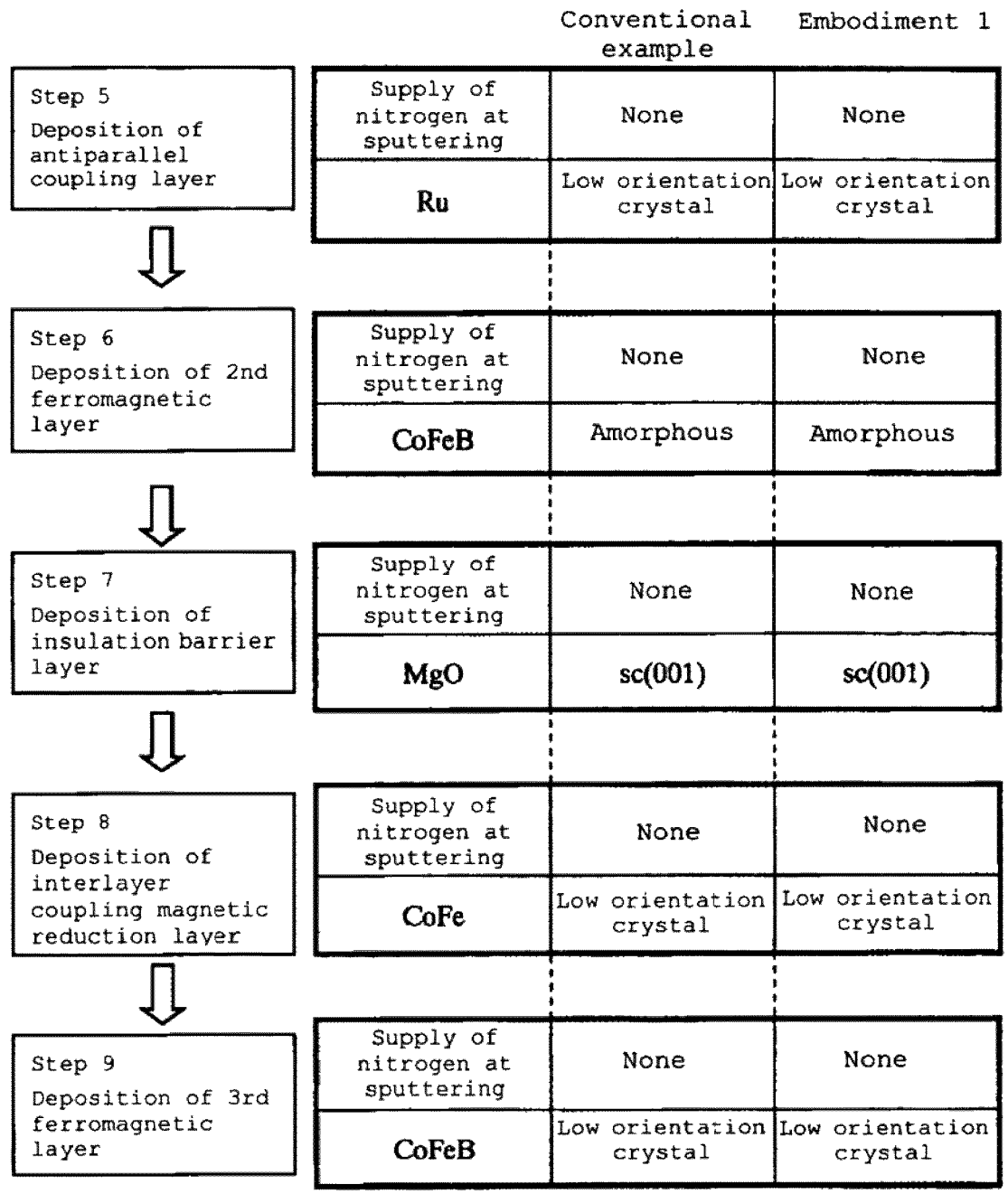
FIG. 4B is a process chart indicating the process for fabricating a TMR sensor film in accordance with one embodiment.

Since the samples discussed so far were prepared for the purpose of study of orientation, only the underlying layer through the antiferromagnetic layer were deposited. They are not complete TMR sensors. Therefore, by going through the process shown in FIG. 4(A) and FIG. 4(B), the following TMR films were completed and their performances as sensors were evaluated, according to several embodiments. The "substrate" appearing below is the lower magnetic shield layer (also serving as an electrode layer).

(6) Substrate/Ta 3 nm/Ni-15 at % Fe(111) 2 nm/Mn-22 at % Ir(111) 6 nm/Co25 at % Fe1.9 nm/Ru0.4 nm/Co-34 at % Fe-15 at % B 2.1 nm/MgO/Co-10 at % Fe 0.4 nm/Co-8 at % Fe-16 at % B 3.5 nm/Ta 3 nm/Ru 4 nm (7) Substrate/Ta 31 nm/Ni-15 at % Fe(001) 2 nm/Mn-22 at % Ir(001) 6 nm/Co25 at % Fe1.9 nm/Ru0.4 nm/Co-34 at % Fe-15 at % B 2.1 nm/MgO/Co-10 at % Fe 0.4 nm/Co-8 at % Fe-16 at % B 3.5 nm/Ta 3 nm/Ru 4 nm (6) is a conventional example of a sensor structure.

Figure 5:
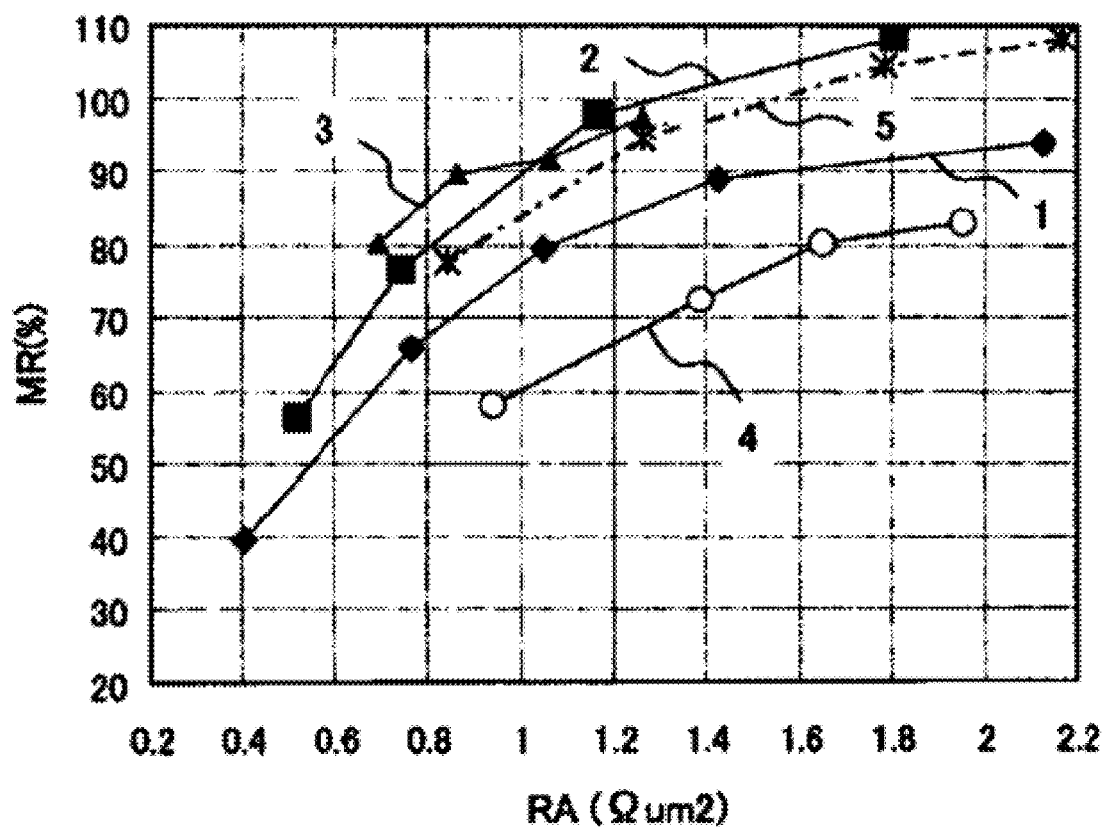
FIG. 5 is a performance graph indicating the areal resistivity (RA) and MR ratio of each of the respective TMR heads in accordance with some embodiments and an example of a conventional TMR head.
Figure 6:
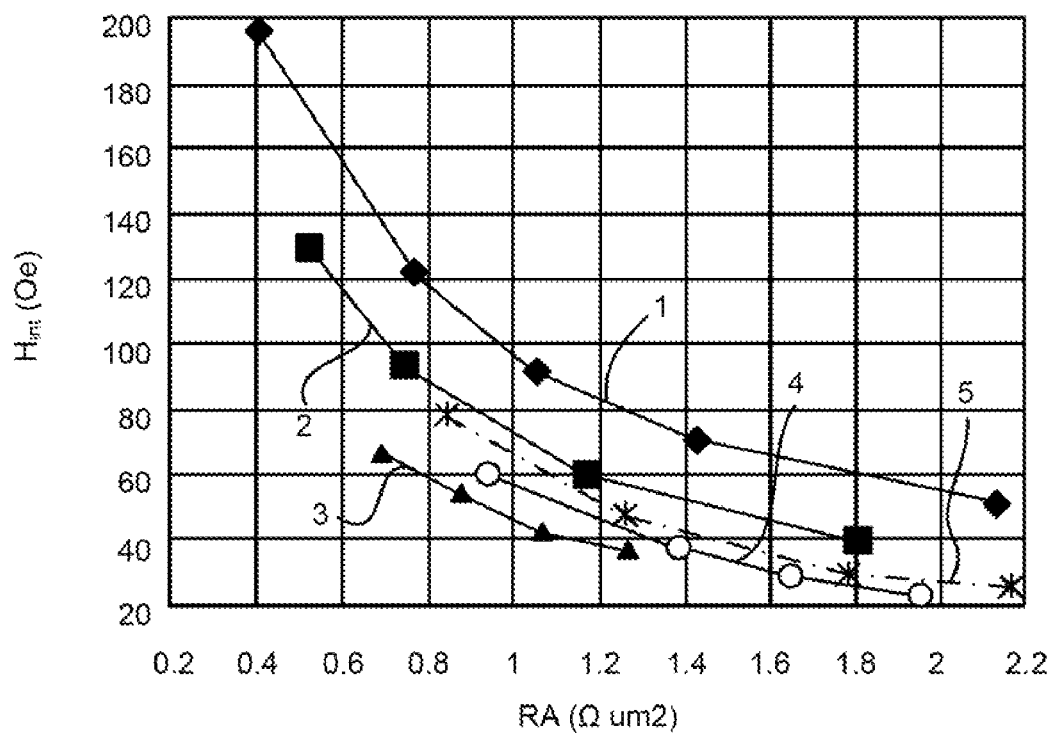
FIG. 6 is a performance graph indicating the areal resistivity (RA) and interlayer coupling magnetic field (Hint) of each of the respective TMR heads in accordance with some embodiments and an example of a conventional TMR head.

Both crystalline orientation control NiFe layer and anti ferromagnetic MnIr layer have the closest-packed planes (111) grown respectively. In the sensor structure (7) in accordance with one embodiment, both crystalline orientation control NiFe layer and anti ferromagnetic MnIr layer have the non-closest-packed planes (001) grown respectively. FIG. 5 and FIG. 6 show how the MR ratio and the interlayer coupling magnetic field Flint are dependent on the areal resistivity RA, respectively. The data obtained with the structures (6) and (7) are given reference numerals 1 and 2, respectively. The MR ratio of the structure (7) in accordance with one embodiment is 10%-15% higher than that of the structure (6). As well, the Hint is reduced by 20-30 Oe. As a result of growing the respective non-closest-packed planes (001) of the crystalline orientation control NiFe layer and antiferromagnetic MnIr, the sensor performance is remarkably improved.

Figure 7:
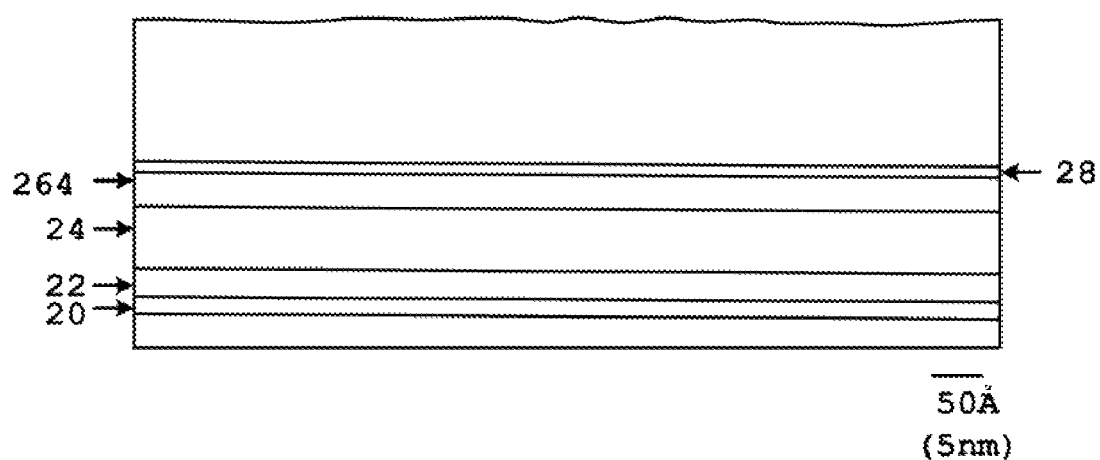
FIG. 7 is a cross-sectional view of a conventional TMR sensor film observed by a transmission electron microscope.
Figure 8:
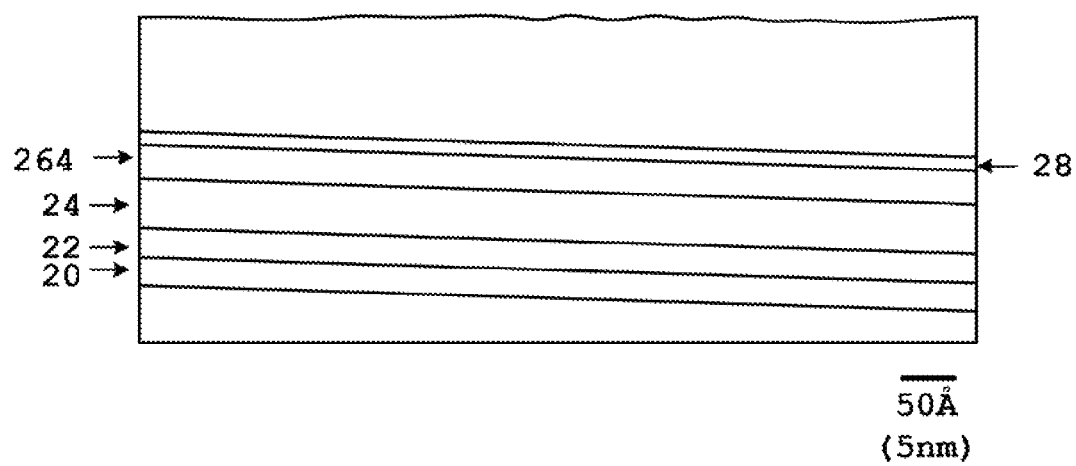
FIG. 8 is a cross-sectional view of a TMR sensor film in accordance with one embodiment, observed by a transmission electron microscope.
Figure 17:
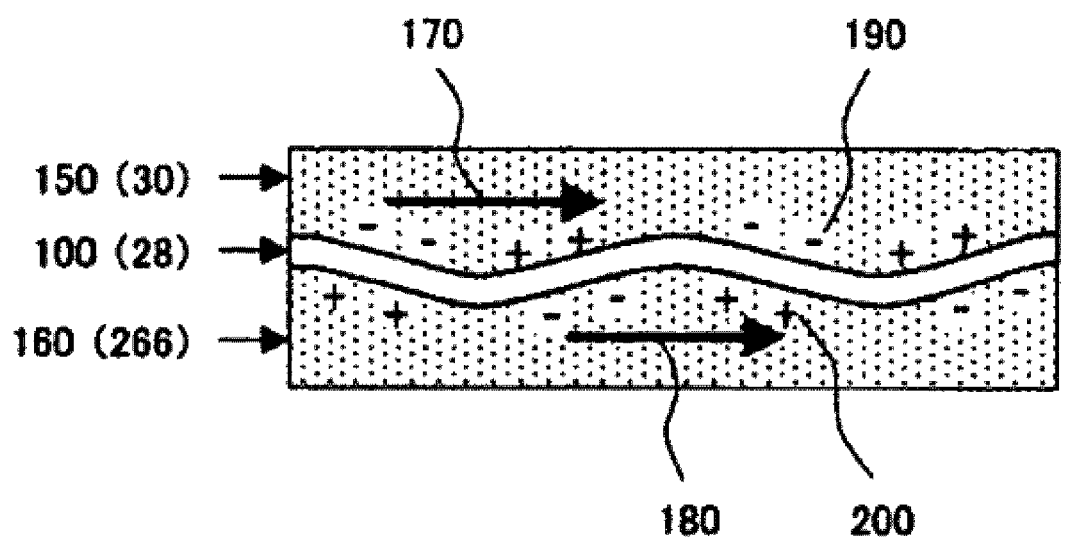
FIG. 17 is provided for explaining the cause of the interlayer coupling magnetic field (Hint) according to Neels' orange peel coupling model.

To examine the cause of the above-mentioned performance improvements, the cross-sectional structures of the sensors (6) and (7) were examined by using a transmission electron microscope. FIG. 7 is a cross-sectional image of structure (6) while FIG. 8 is a cross-sectional image of structure (7) in accordance with several embodiments. Reference numeral 28 refers to the insulation barrier MgO layer. The waviness of the insulation barrier MgO layer is smaller in (7) than in (6). By detailed image analysis, the height h and period λ of interfacial waviness of MgO were evaluated and the result is shown in FIGS. 11A-11B. In the (001)-oriented structure (7) in accordance with one embodiment, corresponding to E in the graph, h=4.9 angstroms (0.49 nm) and λ=110 angstroms (11 nm). In the conventional (111)-oriented structure (6) corresponding to F in the graph, h=12.7 angstroms (1.27 nm) and λ=180 angstroms (18 nm). The interfacial waviness of MgO in the structure (7) is reduced compared with that in the structure (6). FIG. 17 is provided for theoretically explaining why the interlayer coupling magnetic field may be suppressed by this reduced interfacial waviness of MgO. Magnetic poles 190 and 200 may appear at the interface between the insulation barrier layer 28 and the upper ferromagnetic layer 30 and at the interface between the insulation barrier layer 28 and the lower ferromagnetic layer 266. When the interfacial waviness is made smaller, the interlayer coupling magnetic field Hint may be suppressed since the amounts of magnetic poles decrease. In addition, the MR ratio is increased.

According to another embodiment, as described above, the interlayer coupling Hint and the MR ratio are improved by reducing the interfacial waviness of MgO. Therefore, this embodiment is aimed at further reducing the interfacial waviness of MgO, and to that end, a plasma etching process was carried out after the second ferromagnetic layer 266 was deposited.

Figure 9:
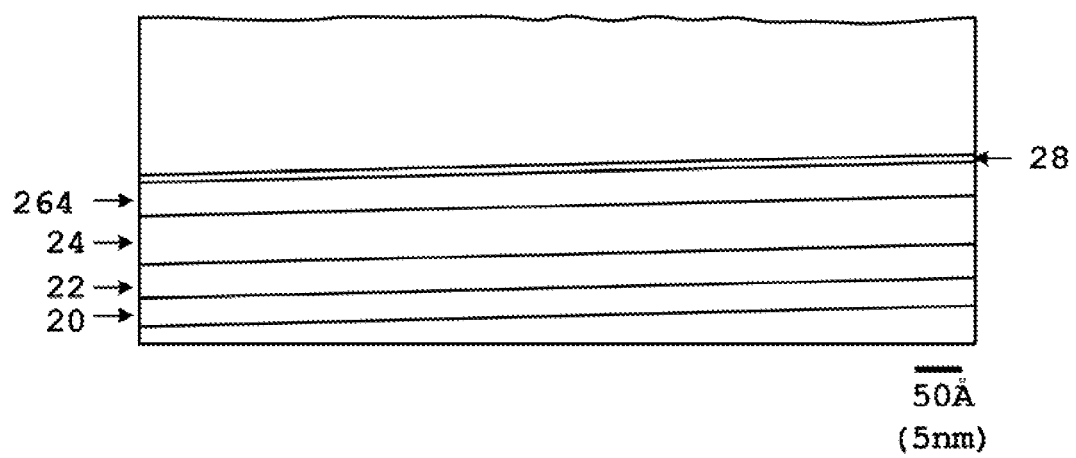
FIG. 9 is a cross-sectional view of a TMR sensor film in accordance with one embodiment, observed by a transmission electron microscope.
Figure 12:
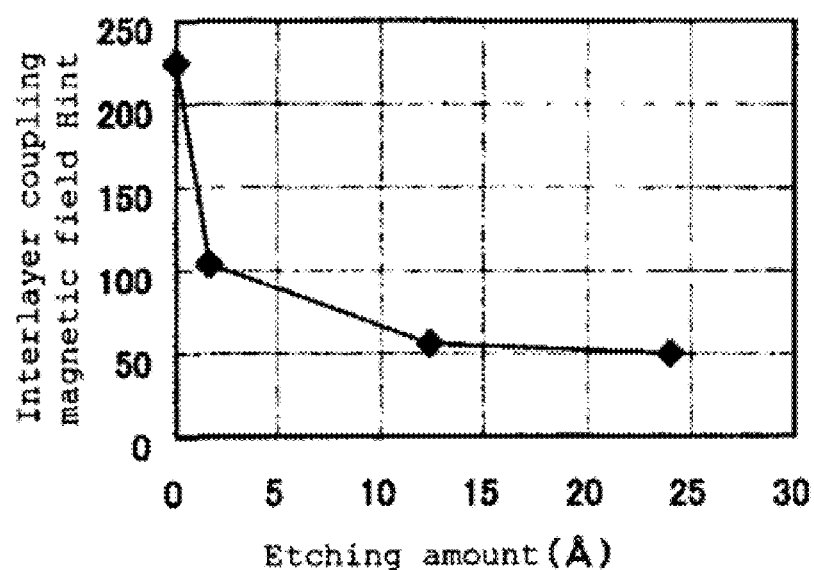
FIG. 12 shows how the interlayer coupling magnetic field (Hint), areal resistivity (RA), and MR ratio are dependent on the amount of etching when plasma etching is performed on the second ferromagnetic layer, according to one embodiment.
Figure 12:
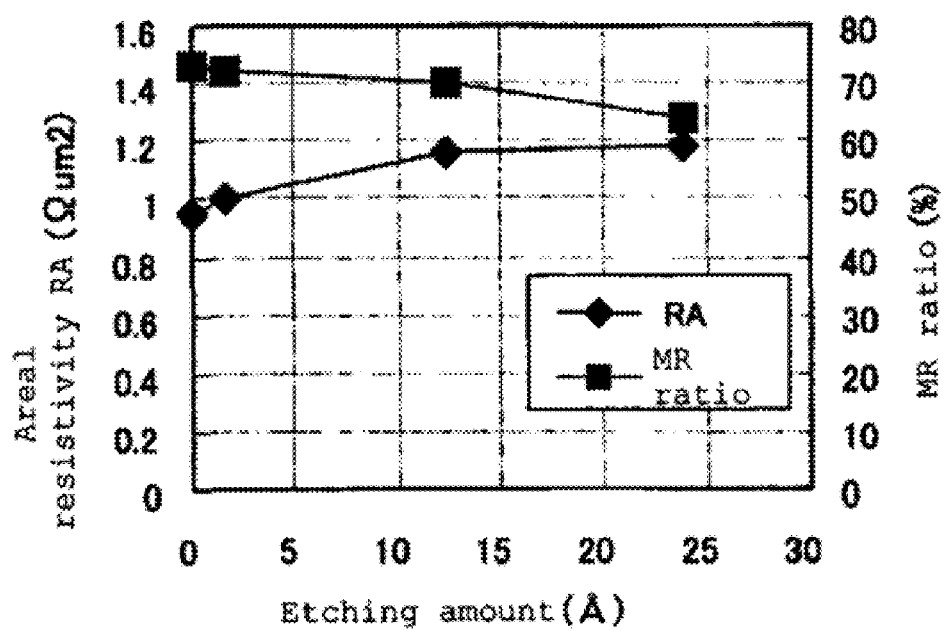

(8) Substrate/Ta3 nm/Ni-15 at % Fe(001) 2 nm/Mn-22 at % Ir(001) 6 nm/Co25 at % Fe1.9 nm/Ru0.4 nm/Co-34 at % Fe-15 at % B4.5 nm/plasma etching/Mgo/Co-10 at % Fe 0.4 nm/Co-8 at % Fe-16 at % B 3.5 nm/Ta 3 nm/Ru 4 nm FIG. 12 shows how the interlayer magnetic field Hint, areal resistivity RA and MR ratio change depending on the amount of etching by plasma etching of Co-34 at % Fe-15 at % B. As the etching amount is increased to around 2 angstroms, the Hint sharply decreases from 200 Oe to 100 Oe. The initial Hint of as large as 200 Oe is attributable to the second ferromagnetic layer 266 being as thick as 45 angstroms. Due to this thickness, its interfacial waviness is very large, which substantially enlarges the Hint. The initially large waviness is sharply decreased only by 2 angstrom etching. Beyond 2.0 angstroms, the Hint gradually decreases. The MR ratio also gradually decreases. FIG. 9 shows a cross-sectional image of a TMR sensor film after 240-angstrom etching is performed. This image is obtained by a transmission electron microscope (TEM). Reference numeral 264 refers to the antiparallel coupling Ru layer while reference numeral 28 refers to the insulation barrier MgO layer. The waviness of the insulation barrier MgO layer is remarkably reduced as compared with the waviness of the anti-parallel coupling Ru layer. FIG. 11C shows results of evaluating the interfacial waviness of the MgO layer. The height of waviness is 0.8 angstrom, smaller than a single-atom layer. A super flat interface is realized. The data given reference numeral 4 in FIG. 5 and FIG. 6 shows how the MR ratio and Hint change depending on the RA when the thickness of the MgO layer of the sensor film in accordance with the present embodiment is changed. The Hint is reduced by about 30 to 40 Oe as compared with the Hint of reference numeral 1 that shows the conventional example. This reduction of the Hint is realized as a result of flattening the MgO interface as shown in FIG. 9. However, the MR ratio is lowered by 10% to 15% as compared with the MR ratio of the reference numeral 1 that shows the conventional example.

In the previous embodiment, reduction of the interlayer magnetic field Flint is realized by performing plasma etching of the second ferromagnetic CoFeB layer so as to reduce the interfacial waviness of MgO to about 1 angstrom or smaller. However, since this lowers the MR ratio, CoFeB alloy is additionally deposited to a depth of about 6 angstroms in order to restore the lowered MR ratio. FIG. 5 and FIG. 6 show how the MR ratio and Hint of the present embodiment are dependent on the RA. Data concerning the present embodiment are given reference numeral 5. Its film structure is shown below.

(9) Substrate/Ta3 nm/Ni-15 at % Fe(001) 2 nm/Mn-22 at % Ir(001)6 nm/Co25 at % Fe1.9 nm/Ru0.4 nm/Co-34 at % Fe-15 at % B4.5 nm/plasma etching 2.5 nm/Co-34 at % Fe-15 at % B 0.6 nm/MgO/Co-10 at % Fe 0.4 nm/Co-8 at % Fe-16 at % B 3.5 nm/Ta 3 nm/Ru 4 nm As understood from data 5 in FIG. 5, the MR ratio is restored as compared with data 4 obtained by performing only plasma etching on the second ferromagnetic layer. The MR ratio is about 10% higher than that of the conventional example 1. The Hint is somewhat larger than data 4 but about 20-30 Oe smaller than that of the conventional example 1.

Figure 10:
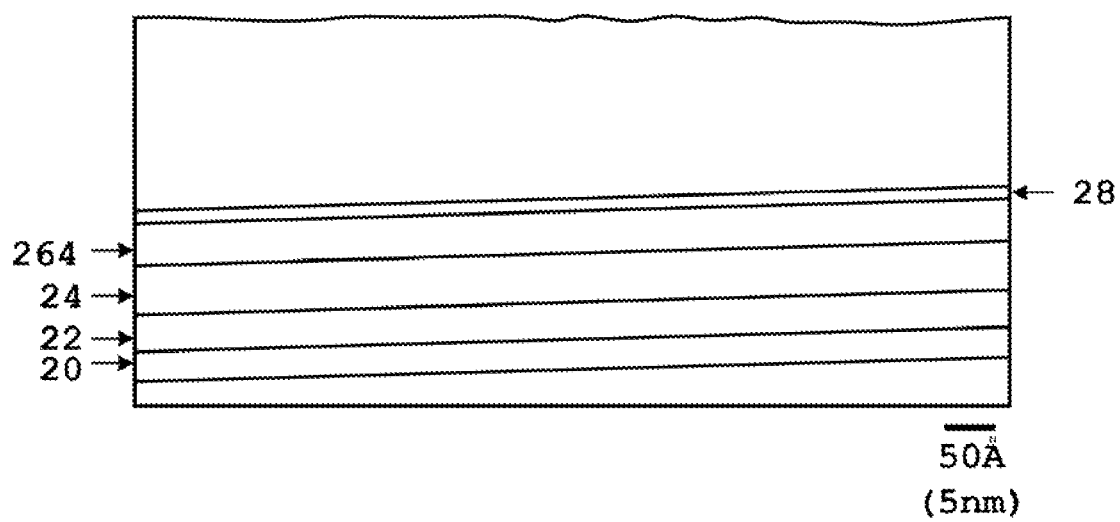
FIG. 10 is a cross-sectional view of a TMR sensor film in accordance with one embodiment, observed by a transmission electron microscope.

Results of observing the MgO interface in the structure of the present embodiment (where CoFeB is deposited again after plasma etching) by using a transmission electron microscope are shown in FIG. 10. The MgO interface is as flat as the super flat MgO interface obtained by performing only plasma etching. Data in FIG. 11A indicates the interfacial waviness h in the present embodiment. Its waviness h is about 1 angstrom, remarkably smaller than the waviness of 13 angstroms in the conventional example (data F). This remarkably reduced waviness results in the remarkably suppressed Hint as compared with the conventional example 1 (FIG. 6).

In the description of one of the previously described embodiments, it is pointed out that the interlayer coupling magnetic field Hint can be suppressed by growing the non-closest-packed plane (001) of MnIr since this reduces the surface waviness of the second ferromagnetic layer. In the sensor (7) in accordance with this embodiment, the second ferromagnetic layer has a singled-layered structure made of Co-34 at % Fe-15 at % B. In the sensor (10) in accordance with the present embodiment, the second ferromagnetic layer has a double-layered structure made of Co-34 at % Fe-15 at % B and Co25 at % Fe. With the total thickness of the double-layered structure kept constant, the thickness of Co-25 at % Fe was varied.

Figure 13:
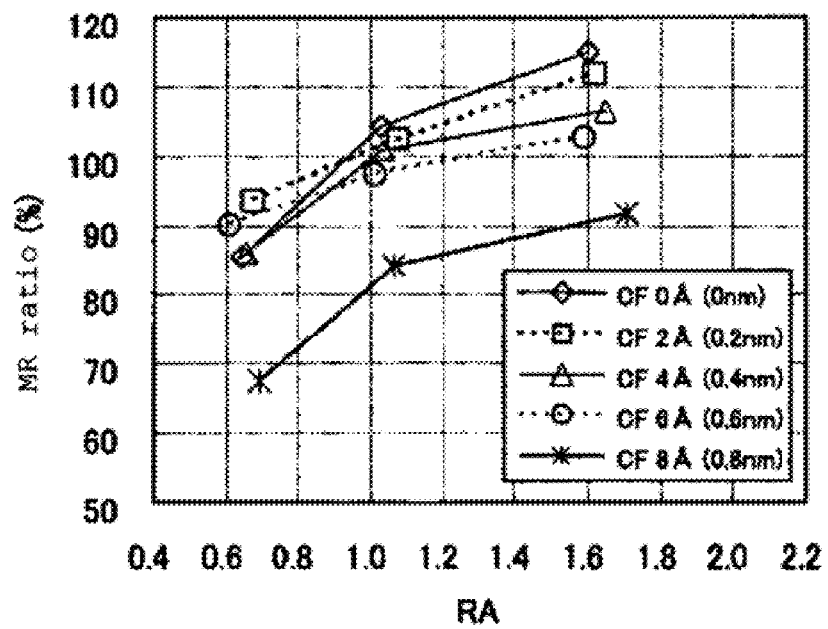
FIG. 13 includes graphs indicating how the MR ratio and interlayer coupling magnetic field (Hint) of a TMR sensor are dependent on the areal resistivity (RA) when the second ferromagnetic layer of the TMR sensor is made of a CoFeB alloy layer and a CoFe alloy layer, according to one embodiment.
Figure 13:
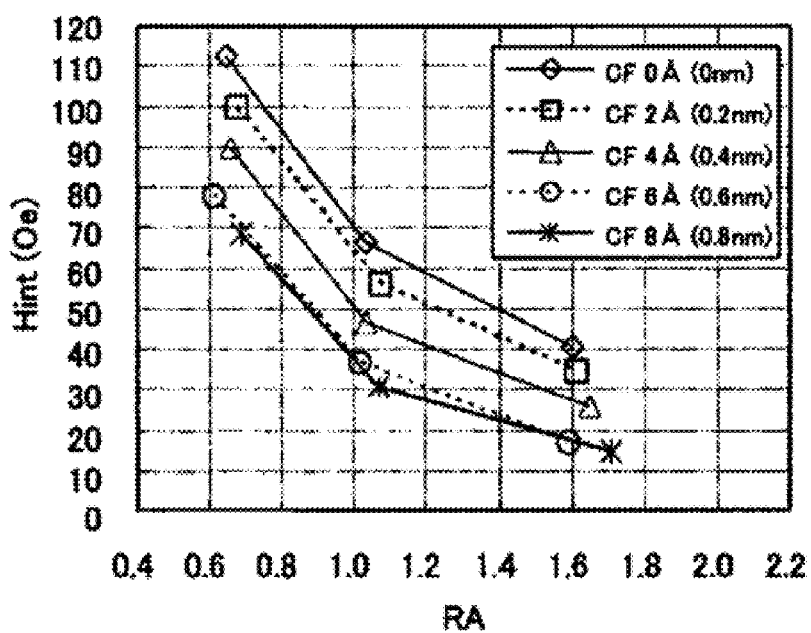

(10) Substrate/Ta 3 nm/Ni-15 at % Fe(001) 2 nm/Mn-22 at % Ir(001) 6 nm/Co25 at % Fe1.9 nm/Ru0.4 nm/Co-34 at % Fe-15 at % B (2.1-X)nm/Co25 at % Fe Xnm/MgO/Co-10 at % Fe 0.4 nm/Co-8 at % Fe-16 at % B 3.5 nm/Ta 3 nm/Ru 4 nm Its results are shown in FIG. 13. Symbol CF in the figure represents the Co-25 at % Fe layer and each numerical value is the thickness of the Co-25 at % Fe layer. As is apparent from FIG. 13($b$), the interlayer coupling magnetic field Hint remarkably reduces as the Co-25 at % Fe is increased from 0 to 6 angstroms (0.6 nm). At an RA of 1.0, the interlayer magnetic coupling magnetic field Hint is halved from 70 Oe to 38 Oe. Beyond 6 angstroms (0.6 nm), the Hint reduction effect disappears since the Hint does not change although the thickness of Co-25 at % Fe is increased to 8 angstroms (0.8 nm). The MR ratio is shown in FIG. 13($a$). Although the MR ratio does not show a remarkable decrease while the thickness of the Co-25 at % Fe is increased from 0 to 6 angstroms (0.6 nm). However, when the thickness is increased further to 8 angstroms, the MR ratio sharply decreases. It was therefore clarified that unless the thickness of the Co-25 at % Fe exceeds 6 angstroms (0.6 nm), it is possible to remarkably suppress the interlayer coupling magnetic field Hint without substantially lowering the MR ratio. The MR ratio and interlayer coupling magnetic field Hint in the present embodiment are dotted in FIG. 5 and FIG. 6. The data obtained with the present embodiment are given reference numeral 3. In FIG. 6, the interlayer coupling magnetic field Hint is 40 to 70 Oe smaller than that in the conventional example 1. In FIG. 5, the MR ratio is 15% to 20% improved as compared with that of the conventional example 1.

Figures 14, 15:
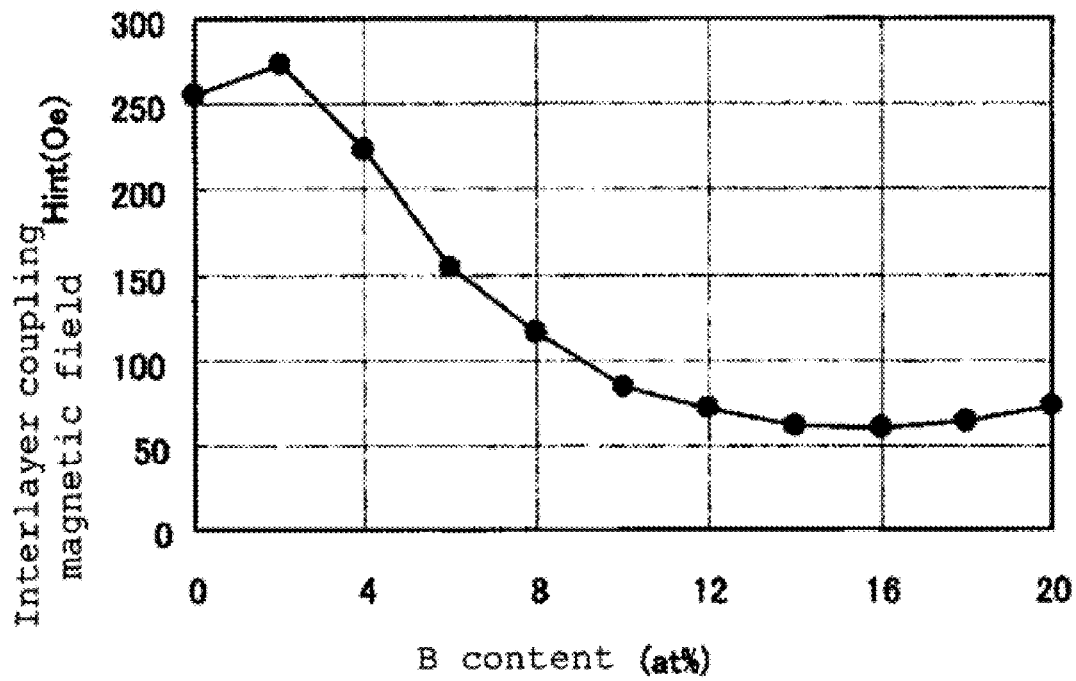
FIG. 14 is a graph indicating how the interlayer coupling magnetic field (Hint) is dependent on the Boron content of the CoFeB alloy of the second ferromagnetic layer, according to one embodiment.
FIG. 15 predicts the read track width, stripe height, and areal resistivity (RA) that may lead to higher recording density.

Although in the above description of the embodiments, the crystalline orientation control layer is a (001)-oriented NiFe alloy layer, this control layer may have a layered structure comprising Ni-contained (001)-oriented alloy layers such as a (001)-oriented NiFeCr alloy layer and a (001)-oriented NiFe alloy layer. In addition, although the anti ferromagnetic layer is made of Mn-22 at % Ir, the Ir content may be any value between 15 at % and 30 at %. As well, although the first ferromagnetic layer is made of Co-25 at % Fe, the Fe content may be not smaller than 20 at wt %. As well, although the second ferromagnetic layer is made of Co-34 at % Fe-15 at % B, the B content may not be any smaller than 10 at wt % since the interlayer coupling magnetic field decreases as the B content is raised and remains the same level when the B content is further raised beyond 10 at % as shown in FIG. 14. In addition, although the insulation barrier side of the second ferromagnetic layer is made of Co-25 at % Fe in one embodiment, this alloy may instead be a different alloy containing at least one of Co and Fe. Further, although the third ferromagnetic layer has a layered structure comprising a Co-10 at % Fe layer and a Co-8 at % Fe-16 at % B layer, this layered structure may instead be an alloy layer comprising at least one element selected from Co, Fe and Ni or a layered structure of alloy layers each containing at least one of the elements selected therefrom. In addition, while the insulation barrier layer is made of MgO, this layer should be not thicker than about 10 angstroms.

It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A tunnel junction type magneto-resistive head, the head comprising:
   a layered film comprising an underlying layer;
   a crystalline orientation control layer;
   an antiferromagnetic layer;
   a first ferromagnetic layer;
   an antiparallel coupling layer;
   a second ferromagnetic layer;
   an insulation barrier layer; and
   a third ferromagnetic layer between a lower magnetic shield layer and an upper magnetic shield layer,
   wherein a non-closest-packed crystallographic plane of the antiferromagnetic layer is directed parallel to a film surface by growing the antiferromagnetic layer substantially conformably on the crystalline orientation control layer,
   wherein the crystalline orientation control layer is an alloy layer comprising Ni
   and is a (001)-oriented crystalline layer.

2. The tunnel junction type magneto-resistive head according to claim 1, wherein the antiferromagnetic layer has a face-centered cubic or face-centered tetragonal crystallographic structure, and the (001) plane of the crystallographic structure is parallel to the film surface.

3. The tunnel junction type magneto-resistive head according to claim 1,
   wherein the underlying layer comprises Ta,
   wherein the crystalline orientation control layer comprises a NiFe alloy or a layered structure comprising a NiFeCr alloy and a NiFe alloy,
   wherein the antiferromagnetic layer comprises an MnIr alloy, and
   wherein the insulation barrier layer comprises MgO.

4. The tunnel junction type magneto-resistive head according to claim 1,
   wherein the antiferromagnetic layer comprises a MnIr alloy, and
   wherein interfaces between the insulation barrier layer and the second ferromagnetic layer and interfaces between the insulation barrier layer and the third ferromagnetic layer are substantially flat such that a difference of height between a bottom of a lowest valley and a top of a highest peak is less than about 6 angstroms and a valley-to-valley average interval is greater than about 60 angstroms.

5. The tunnel junction type magneto-resistive head according to claim 1,
   wherein the underlying layer comprises Ta,
   wherein the crystalline orientation control layer comprises a NiFe alloy or a layered structure comprising a NiFeCr alloy layer and a NiFe alloy layer,
   wherein the antiferromagnetic layer comprises a MnIr alloy,
   wherein the first ferromagnetic layer comprises a CoFe alloy,
   wherein the antiparallel coupling layer comprises Ru,
   wherein the second ferromagnetic layer comprises a CoFeB alloy,
   wherein the insulation barrier layer comprises MgO, and
   wherein the third ferromagnetic layer comprises a CoFeB alloy.

6. A method for manufacturing a tunnel junction type magneto-resistive head as recited in claim 1, the method comprising:
   depositing the crystalline orientation control layer by sputtering in a mixed gas of argon and nitrogen to produce a preferential growth of the crystallographic (001) plane of the Ni alloy.

7. The method for manufacturing a tunnel junction type magneto-resistive head according to claim 6, further comprising depositing the antiferromagnetic layer by conformably growing a MnIr alloy layer on the crystalline orientation control layer.

8. The method for manufacturing a tunnel junction type magneto-resistive head according to claim 6, further comprising depositing the second ferromagnetic layer by partially removing a CoFeB alloy layer by argon plasma etching after the CoFeB alloy layer is deposited so as to reduce the waviness of an interface with the insulation barrier layer.

9. The method for manufacturing a tunnel junction type magneto-resistive head according to claim 8, further comprising depositing a CoFeB alloy layer after the CoFeB alloy layer is partially removed by argon plasma etching.

10. The method for manufacturing a tunnel junction type magneto-resistive head according to claim 6, further comprising depositing a second CoFe alloy layer in the second ferromagnetic layer on the antiparallel coupling layer after a first CoFe alloy layer is deposited so as to reduce a waviness of an interface with the insulation barrier layer.

11. A tunnel junction type magneto-resistive head, the head comprising:
    a layered film comprising an underlying layer;
    a crystalline orientation control layer;
    an antiferromagnetic layer;
    a first ferromagnetic layer;
    an antiparallel coupling layer;
    a second ferromagnetic layer;
    an insulation barrier layer; and
    a third ferromagnetic layer between a lower magnetic shield layer and an upper magnetic shield layer,
    wherein a non-closest-packed crystallographic plane of the antiferromagnetic layer is directed parallel to a film surface by growing the antiferromagnetic layer substantially conformably on the crystalline orientation control layer,
    wherein the insulation barrier layer comprises MgO,
    wherein the second ferromagnetic layer is a layered structure comprising a CoFeB alloy layer and a CoFe alloy layer, and
    wherein the CoFe alloy layer is in contact with the insulation barrier layer.

12. The tunnel junction type magneto-resistive head according to claim 11, wherein the CoFe alloy layer of the second ferromagnetic layer has a thickness less than about 6 angstroms.

13. The tunnel junction type magneto-resistive head according to claim 11,
    wherein the third ferromagnetic layer is a layered structure comprising a CoFe alloy layer and a CoFeB alloy layer, and
    wherein the CoFe alloy layer is in contact with the insulation barrier layer.

14. A tunnel junction type magneto-resistive head, the head comprising:
    a layered film comprising an underlying layer;
    a crystalline orientation control layer;
    an antiferromagnetic layer;
    a first ferromagnetic layer;

an antiparallel coupling layer;
a second ferromagnetic layer;
an insulation barrier layer; and
a third ferromagnetic layer between a lower magnetic shield layer and an upper magnetic shield layer,
wherein a non-closest-packed crystallographic plane of the antiferromagnetic layer is directed parallel to a film surface by growing the antiferromagnetic layer substantially conformably on the crystalline orientation control layer,
wherein the underlying layer comprises Ta,
wherein the crystalline orientation control layer comprises a NiFe alloy or a layered structure comprising a NiFeCr alloy layer and a NiFe alloy layer,
wherein the antiferromagnetic layer comprises a MnIr alloy,
wherein the first ferromagnetic layer comprises a CoFe alloy,
wherein the antiparallel coupling layer comprises Ru,
wherein the second ferromagnetic layer comprises a CoFeB alloy,
wherein the insulation barrier layer comprises MgO, and
wherein the third ferromagnetic layer comprises a CoFeB alloy,
wherein a CoFe alloy layer is positioned between the second ferromagnetic layer and the insulation barrier layer, and
wherein a CoFe alloy layer is positioned between the insulation barrier layer and the third ferromagnetic layer.

* * * * *

UNITED STATES PATENT AND TRADEMARK OFFICE
CERTIFICATE OF CORRECTION

PATENT NO. : 8,254,067 B2
APPLICATION NO. : 12/563943
DATED : August 28, 2012
INVENTOR(S) : Koichi Nishioka et al.

It is certified that error appears in the above-identified patent and that said Letters Patent is hereby corrected as shown below:

In the specification:

col. 3, line 42, replace "is" with --as--;

col. 3, lines 58 and 59, replace "anti ferromagnetic" with --antiferromagnetic--;

col. 5, line 34, replace "Ni Fe" with --NiFe--;

col. 6, line 59, replace "anti ferromagnetic" with --antiferromagnetic--;

col. 12, line 10, replace "anti ferromagnetic" with --antiferromagnetic--;

col. 12, line 13, replace "Flint" with --Hint--;

col. 13, line 26, replace "Flint" with --Hint--;

col. 14, line 40, replace "anti ferromagnetic" with --antiferromagnetic--.

Signed and Sealed this
Eighth Day of January, 2013

David J. Kappos
*Director of the United States Patent and Trademark Office*